US009961382B1

(12) United States Patent
Dorner et al.

(10) Patent No.: US 9,961,382 B1
(45) Date of Patent: May 1, 2018

(54) INTERACTION-BASED IDENTIFICATION OF ITEMS IN CONTENT

(71) Applicant: Amazon Technologies, Inc., Seattle, WA (US)

(72) Inventors: Charles Shearer Dorner, Seattle, WA (US); Robert Yuji Haitani, Seattle, WA (US); Jongwoo Lee, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/277,910

(22) Filed: Sep. 27, 2016

(51) Int. Cl.
| | |
|---|---|
| H04N 7/173 | (2011.01) |
| H04N 7/16 | (2011.01) |
| H04N 21/25 | (2011.01) |
| H04N 21/24 | (2011.01) |
| H04N 21/234 | (2011.01) |
| H04N 21/266 | (2011.01) |

(52) U.S. Cl.
CPC ..... *H04N 21/251* (2013.01); *H04N 21/23418* (2013.01); *H04N 21/2408* (2013.01); *H04N 21/26603* (2013.01)

(58) Field of Classification Search
None
See application file for complete search history.

(56) References Cited

U.S. PATENT DOCUMENTS

| | | | |
|---|---|---|---|
| 6,496,981 B1 * | 12/2002 | Wistendahl .......... | G11B 27/034 345/619 |
| 9,088,823 B1 * | 7/2015 | Price ................. | H04N 21/4667 |
| 2001/0023436 A1 * | 9/2001 | Srinivasan ........... | G11B 27/031 709/219 |
| 2003/0149983 A1 * | 8/2003 | Markel ................ | H04N 7/088 725/51 |
| 2004/0233233 A1 * | 11/2004 | Salkind ............. | G06F 17/30017 715/719 |
| 2005/0235318 A1 * | 10/2005 | Grauch ................ | G06Q 30/02 725/46 |
| 2008/0098425 A1 * | 4/2008 | Welch ................ | H04N 5/44513 725/37 |
| 2009/0064219 A1 * | 3/2009 | Minor .................. | G06Q 30/02 725/32 |
| 2009/0092374 A1 * | 4/2009 | Kulas ..................... | H04N 7/173 386/248 |
| 2012/0078626 A1 * | 3/2012 | Tsai ........................ | G10L 15/26 704/235 |
| 2013/0061268 A1 * | 3/2013 | Rothschild ....... | H04N 21/23431 725/51 |
| 2013/0212477 A1 * | 8/2013 | Averbuch ........... | H04N 21/4725 715/719 |

(Continued)

*Primary Examiner* — William J Kim
(74) *Attorney, Agent, or Firm* — Knobbe, Martens, Olson & Bear, LLP

(57) ABSTRACT

Features are provided for the identification of objects in content, such as video content, by analyzing data regarding viewer interactions with other content. The interaction data can be analyzed to identify correlations between time periods of the video (or the video in general) and items that are the subject of, or otherwise associated with, other content with which viewers interact. These correlations can be used to provide, to subsequent viewers of the video, information regarding the items shown in the video, recommendations regarding items or content that may be of interest to subsequent viewers of the video, etc.

20 Claims, 5 Drawing Sheets

(56) References Cited

U.S. PATENT DOCUMENTS

| | | | |
|---|---|---|---|
| 2014/0089813 A1* | 3/2014 | Pajouh | H04N 21/45455 715/748 |
| 2015/0245103 A1* | 8/2015 | Conte | H04N 21/47815 725/60 |
| 2015/0268822 A1* | 9/2015 | Waggoner | G06F 3/04842 715/722 |

* cited by examiner

INTERACTION-BASED IDENTIFICATION OF ITEMS IN CONTENT

BACKGROUND

Generally described, computing devices and communication networks can be utilized to exchange content and other information. In a common application, a server computing system can provide content to various client computing devices. The content may be textual content, image-based content, videos, animations, some combination thereof, etc. For example, a server computing system can host or provide access to videos that are viewable by client computing devices. A client computing device can transmit a request for a video to the server computing system, and in response the server computing system can transmit or "stream" the requested video to the client computing device. The client computing device can display the video and respond to various playback commands (e.g., pause, rewind, etc.).

Some systems process video content to identify people or objects that appear in the video content. For example, computer vision processing may be used to identify objects or faces of people appearing in videos. Some computer vision systems are configured or "trained" to identify features of objects in video content, and to generate scores indicating likelihoods that various objects are present in the video. Computer vision systems often perform this process on a frame-by-frame basis. From the perspective of a user of a computer vision system, the performance of the system can be measured in terms of the accuracy with which the computer vision system can recognize objects in video content, and the speed with which the computer vision system can complete such processing.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
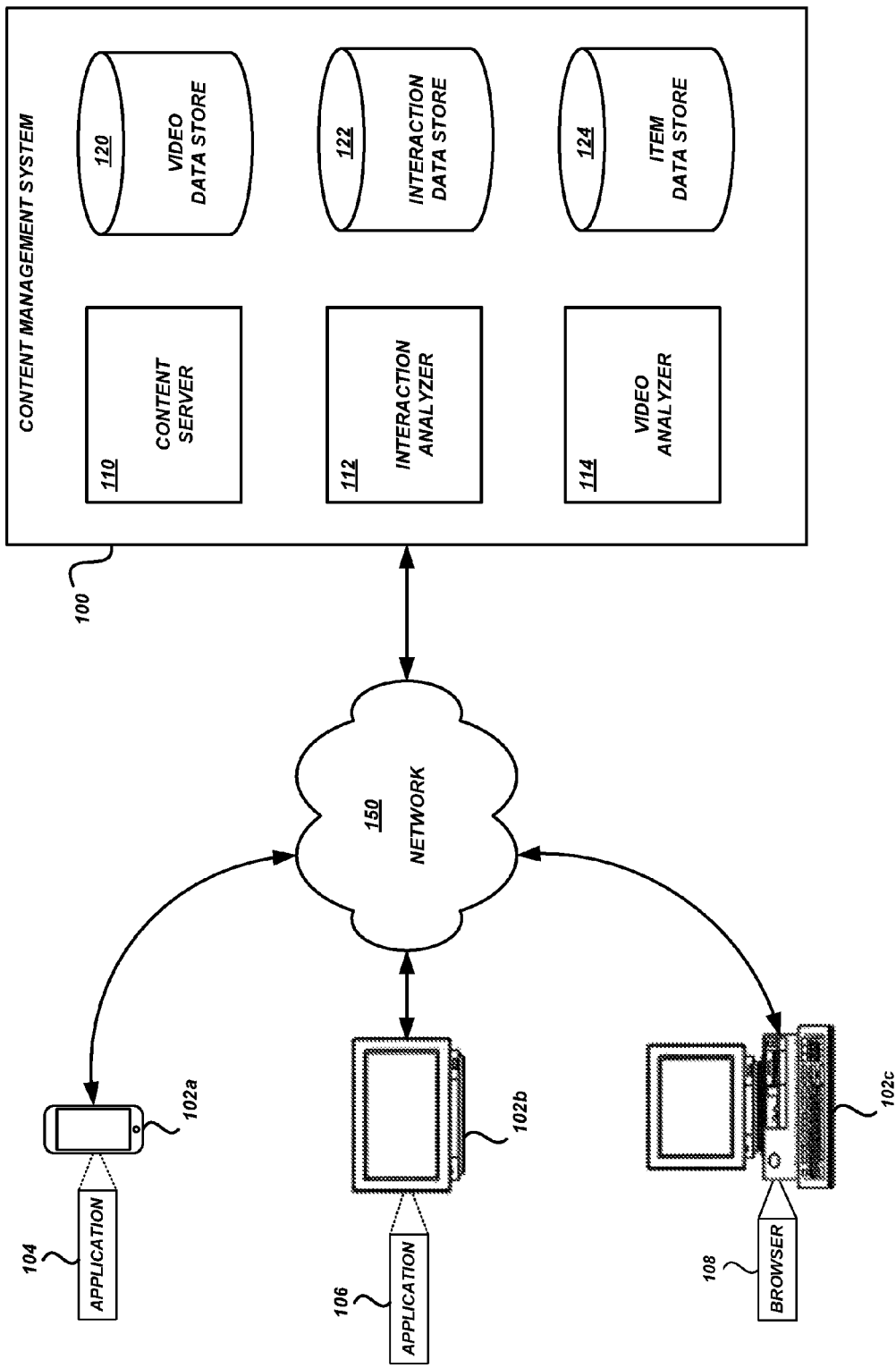
FIG. 1 is a block diagram of an illustrative computing environment including a content management system and various user devices according to some embodiments.

The present disclosure is directed to the identification of objects in content, such as video content, by analyzing data regarding viewer interactions with other content. For example, a content management system can provide video content to multiple viewer devices, and obtain interaction data regarding viewer interactions with other content, including viewer interactions that occur both during and after viewing the provided video content. The interaction data can be analyzed to identify correlations between time periods of the video (or the video content in general) and items that are the subject of, or otherwise associated with, other content with which viewers interact. If the viewers are requesting, viewing, or otherwise interacting with content regarding items that they have seen in the video more often than they would be interacting with such content otherwise, the content management system can infer that the items may be shown in the video content. These item identifications can be used to provide, to subsequent viewers, information regarding the items shown in the videos, recommendations regarding items or content that may be of interest to subsequent viewers of the videos, etc.

Some conventional systems use automated computer vision processing to identify items in videos. Illustratively, a computer vision system may analyze an entire piece of video content frame-by-frame to identify features that correspond to items that the computer vision system is trained to recognize. However, such systems may not recognize some items with a high degree of accuracy if a broad-coverage general recognition model is used. For example, a computer vision system may incorrectly recognize a less common item as a more common item. In addition, conventional computer vision systems may not recognize some common items if a specialized model that is trained to recognize a certain class of items is used. For example, a computer vision system may incorrectly recognize—or fail to recognize altogether—a fairly common item that the specialized model is not trained to recognize. Moreover, the processing of a lengthy video file (e.g., a two-hour movie) to recognize items can be time consuming in addition to being susceptible to the errors described above.

Some aspects of the present disclosure relate to obtaining data regarding viewer interactions taken with respect to other content during or shortly after viewing a particular video content item. The interactions of viewers with other content items can provide evidence of what was shown in the video content item. For example, viewers may access content regarding items in a movie that they are currently watching or have recently watched, such as clothing or accessories worn by a character in the movie, furnishings shown in the movie, etc. Interaction data can be analyzed to identify statistically significant increases of item-specific content activity occurring during or shortly after the viewers have watched a movie (e.g., lognormal distributions, with respect to time, of requests for content regarding particular items or of purchases of the particular items). If such an increase of activity does not occur in interaction data for viewers who have not watched the movie, then the increase can be attributed to (or at least correlated with) viewing the movie. Depending upon the type of increase, the interactions may be associated with a particular portion of the movie. For example, if content interactions regarding a particular item peak at a particular time while the viewers are watching the movie, then the interactions can be attributed to (or at least correlated with) a window of time within the movie preceding or coinciding with the peak (or multiple windows of time if there are multiple peaks). To verify that the item was indeed shown in the movie during the window of time, targeted computer vision processing can be performed on the movie during the window of time to specifically identify the item or related items. In this way, items can be at least preliminarily identified though data analysis processes that may be more efficient than generalized computer vision processes. In addition, subsequent computer vision processing can be performed in a targeted manner on a small portion of video content, which may be more efficient and accurate than generalized computer vision processing of an entire video.

Additional aspects of the present disclosure relate to providing information, recommendations, and the like to subsequent viewers of content in which items have been recognized. Once an item has been identified in a particular portion of video content (or associated with the video content generally), information regarding the item can be presented to viewers. For example, when an item is identified in a particular scene, subsequent viewers of the particular scene in the video may be presented with an option to obtain information regarding the item, to purchase the item, etc. In some embodiments, subsequent viewers may be provided with recommendations regarding items in a video (e.g., content or purchase options) when the viewers begin watching the video, reach a scene in which the item has been identified, finish the watching the video, etc. Because items are identified based on their interest to viewers of the video content, information about the items can be provided to subsequent viewers with a high degree of confidence that the information and items will be of interest the viewers.

Although aspects of some embodiments described in the disclosure will focus, for the purpose of illustration, on particular examples of content, items, and interactions, the examples are illustrative only and are not intended to be limiting. In some embodiments, the techniques described herein may be applied to additional or alternative content, algorithms, etc. For example, the content in which items are to be identified may be image content (e.g., pictures, drawings, etc.), audio content (e.g., audio books, podcasts, music, etc.), textual content (e.g., electronic books or "e-books"), or the like. As another example, the information that is provided to subsequent viewers/listeners/users may not be information about the specific item identified in the content, but may instead or additionally be information regarding a related item, alternative item, etc. As a further example, instead of or in addition to recognizing items, the techniques described herein may be applied to the recognition of people, animals, geographic locations, or the like. Various aspects of the disclosure will now be described with regard to certain examples and embodiments, which are intended to illustrate but not limit the disclosure.

Network-Based Content Delivery Environment

With reference to an illustrative embodiment, FIG. 1 shows a network environment in which aspects of the present disclosure may be implemented. As shown, the network environment may include a content management system 100 and various user devices 102a, 102b, and 102c (collectively "user devices 102"). The user devices 102 and content management system 100 may communicate with each other via one or more communication networks 150. A communication network 150 may be a publicly accessible network of linked networks, possibly operated by various distinct parties, such as the Internet. In other embodiments, the network 150 may include a private network, personal area network, local area network, wide area network, cable network, satellite network, cellular telephone network, etc. or a combination thereof, some or all of which may or may not have access to and/or from the Internet.

The content management system 100 may include various components for providing the features described herein. Illustratively, the content management system 100 may include a content server 110 configured to provide content to the various user devices 102. The content management system 100 may also include an interaction analyzer 112 configured to identify items in video content based on the analysis of data regarding interactions, of viewers of the video content, with other content during and/or after viewing the video content. The content management system 100 may also include a video analyzer 114 configured to analyze portions of video content and identify particular items associated with viewer interactions with other content. The content management system 100 may also include various data stores to store data and/or files in connection with content management and item recognition. For example, the content management system 100 may include a video data store 120 to store video content that is provided to viewers and in which items are identified. The content management system 100 may also include an interaction data store 122 to store information regarding viewer interactions with other content during and after viewing video content. The content management system 100 may also include an items data store 124 to store data regarding the items identified in the video content stored in the video data store 120.

The content management system 100 may be implemented on one or more physical server computing devices that provide computing services and resources to users. Illustratively, the content management system 100 (or individual components thereof, such as the content server 110, interaction analyzer 112, video analyzer 114, or data stores 120, 122, and 124) may be implemented on one or more blade servers, midrange computing devices, mainframe computers, desktop computers, or any other computing device configured to provide computing services and resources. In some embodiments, the features and services provided by the content management system 100 may be implemented as web services consumable via the communication network 150. In further embodiments, the content management system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

The individual user devices 102 may be any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), set-top boxes, smart televisions, and various other electronic devices and appliances. A user, also referred to as a viewer or a customer, may operate a user device 102 to retrieve content from the content management system 100 and/or other content sources, interact with the content, and the like. In some embodiments, a viewer may launch specialized application software, such as a mobile application 104 executing on a mobile device 102a (e.g., smart phone or tablet), or a home entertainment application 106 executing on a home media player (e.g., a set-top box or smart TV). The applications 104 and 106 may be specifically designed to interface with the content management system 100 for accessing content and/or interacting with other content. In some embodiments, a viewer may use other application software, such as a browser application 108 executing on a computing device 102c, to interact with the content management system 100 and/or other content sources.

Item Identification Process

Figure 2:
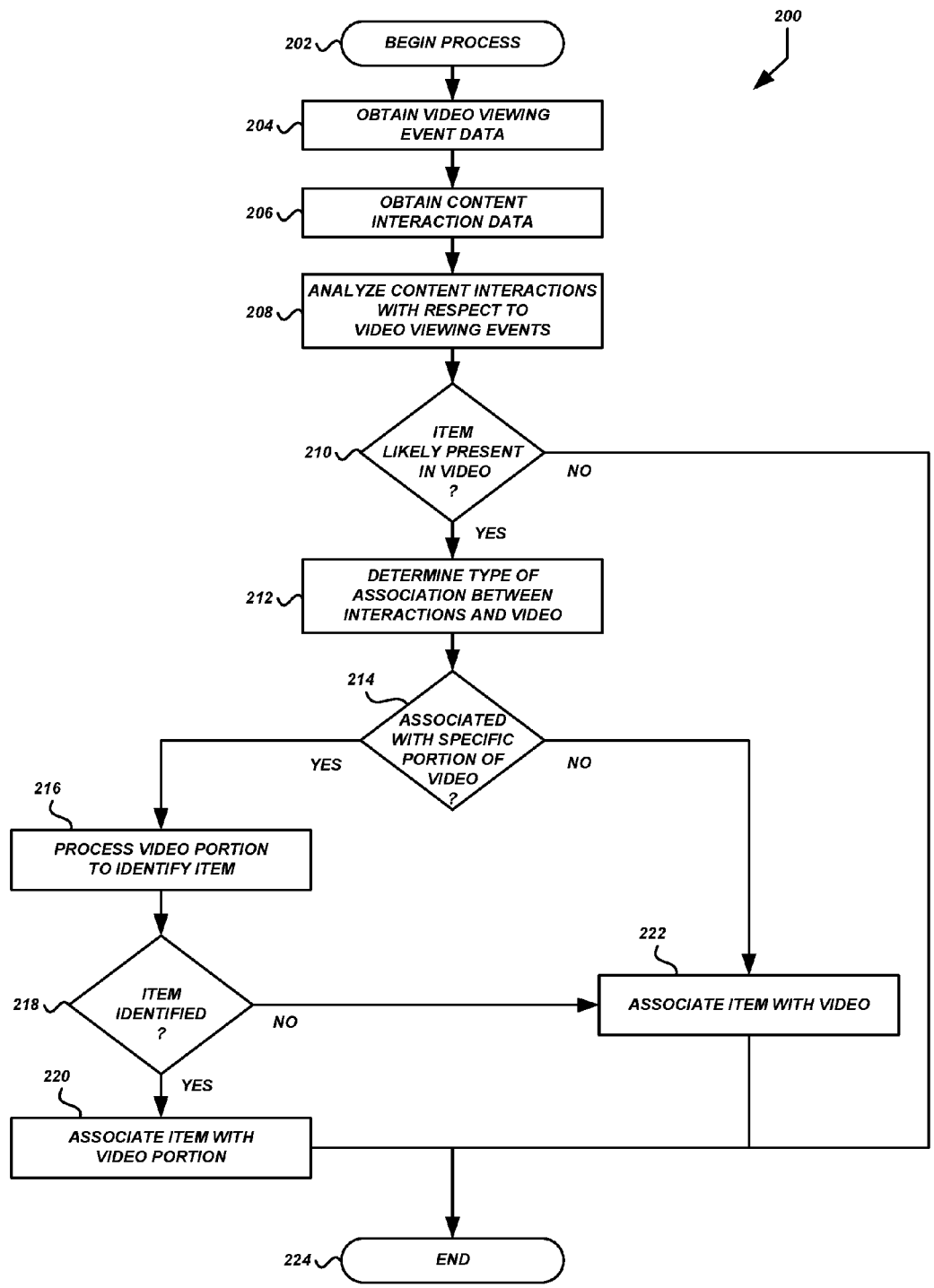
FIG. 2 is a flow diagram of an illustrative process for identifying items in video content based on an analysis of data regarding user interactions with other content.

FIG. 2 is a flow diagram of an illustrative process 200 for interaction-based identification of items in video content. A content management system 100 performing the process 200 may obtain interaction data from multiple user devices 102, or from a third-party system that collects such interaction data. The content management system 100 may analyze the data to determine which items may be present in videos viewed by viewers whose interactions are reflected in the interaction data. Advantageously, the identification of items in videos based on the content interactions of viewers can streamline—or replace altogether—the computer vision processing of video content to identify items shown in the video content. In addition, because items are identified based on their interest to previous viewers of the video content, the identified items may be more likely to be of interest to subsequent viewers of the video content than other items identified only by general computer vision processing.

The process 200 begins at block 202. The process 200 may begin in response to an event, such as on a predetermined or dynamically determined schedule, on demand when initiated by a system administer, or in response to some other event. When the process 200 is initiated, a set of executable program instructions stored on one or more non-transitory computer-readable media (e.g., hard drive, flash memory, removable media, etc.) may be loaded into memory (e.g., random access memory or "RAM") of a server or other computing device of the content management system 100. The executable instructions may then be executed by a hardware-based computer processor (e.g., a central processing unit or "CPU") of the computing device. In some embodiments, the process 200 or portions thereof may be implemented on multiple computing devices and/or multiple processors, serially or in parallel.

At block 204, the interaction analyzer 112 or some other module or component of the content management system 100 may obtain data regarding the viewing of video content. The data may indicate: which viewers have viewed which videos; when viewing of individual videos was initiated; whether the viewing proceeded uninterrupted, ended prematurely, was paused, or was spread out over multiple viewing sessions; whether portions were re-watched or skipped; whether scrubbing, scanning, reviewing, changing playback speed, or other such view events were performed; etc. For example, the video viewing data may be stored as records in the videos or interactions data stores 120 or 122. The data can include a unique identifier of a video (e.g., a serial number of a movie), a unique identifier of a viewer (e.g., a user ID number), and one or more date/time items corresponding to when viewing of video commenced, completed, etc.

At block 206, the interaction analyzer 112 or some other module or component of the content management system 100 may obtain data regarding the interactions of viewers with other content during and/or after viewing video content. The data may indicate which viewers have performed which interactions with which content items, when the interactions were performed, the nature of the interactions (e.g., content request, submission of information, purchase of a product, etc.), and the like. The data can include a unique identifier of a user (e.g., a user ID number), a unique identifier of a content item (e.g., a serial number of a content item, a uniform resource identifier or "URI" of a content item, etc.), an identifier of the interaction (e.g., a code corresponding to a content access event, a purchase, etc.), a date/time of the interaction, and the like. In some embodiments, the content management system 100 may track the interactions of viewers with other content provided by the content management system. For example, the content management system 100 may provide video content and also other content, such as textual content, shopping capabilities, and the like. Because the content management system 100 provides the other content, the content management system 100 can track the interactions of users (e.g., viewers of videos and other users) with the content. In some embodiments, the content management system 100 may receive some or all of the interaction data form a third party system. For example, the content management system may only provide video content, and may receive content interaction data from one or more other content providers.

At block 208, the interaction analyzer 112 or some other module or component of the content management system 100 can analyze the interaction data with respect to the timing of video viewing events. The interaction data can be processed to identify particular events that occur after a viewer initiates viewing of a content item, or within a threshold period of time of viewing a content item. Illustratively, block 208 (or the process 200 generally) may be performed for a single content item, such as a movie, and repeated as necessary for other content items.

Data regarding interactions of viewers can be compared to the date and time that the viewers initiated viewing of the movie, and an offset or relative time may be determined for the individual interactions with respect to the viewing of the movie. For example, a particular user may have initiated viewing of the movie at 12:00 PM on Sep. 1, 2016. Thus, the content interactions of interest for that viewer may be limited to those occurring on or after that time. In some embodiments, the interactions of interest may be limited to those occurring within a threshold period of time after initiating viewing the movie, after finishing the movie, etc. In the present example, the threshold period of time may be 24 hours. Thus, the content interactions of interest may be limited to those occurring between 12:00 PM on Sep. 1, 2016 and 12:00 PM on Sep. 2, 2016. A different viewer may have initiated viewing of the movie at 6:00 PM on Aug. 15, 2016. Thus, the content interactions of interest for that viewer may be limited to those occurring within a 24-hour period of time beginning 6:00 PM on Aug. 15, 2016. The 24-hour time threshold used in this example is illustrative only, and is not intended to be limiting. In some embodiments, a different threshold may be used, a different starting time may be used (e.g., after viewing has completed, at the midpoint of the movie, etc.), or no such threshold may be used.

The interactions of interest may include interactions that can be tied to specific items. Content may be previously associated with particular items such that content interaction records can be tied to the particular items. In some embodiments, content may be analyzed after data regarding content interactions has been received. For example, content associated with a browsing interaction may be analyzed to identify a particular item after the interaction analyzer receives information reflecting the content browse event.

Data regarding the purchase of an item, search requests initiated using a keyword corresponding to the item, viewing content regarding or referencing an item, and other such interactions may be obtained and compared to a viewing event time as described above. The interactions may be initiated using the same user device 102 that is used to view the video content. For example, a viewer may initiate viewing a video on a personal computing device, such as a laptop computer. The viewer may view the video in one display window of the device, while browsing content in another display window. The viewer may therefore see an item of interest in the video, and have the capability of looking up information regarding the item and/or purchasing the item while still viewing the video, or after completing viewing the video. In some embodiments, interactions may be initiated using a different user device 102 than is used to view the video content. For example, a viewer may initiate viewing a video on a set-top box that outputs the video to a television. The viewer may view the video on the television while concurrently or subsequently browsing for content on a different user device 102, such as a smart phone or tablet computer. In such a scenario, the viewer may see an item of interest in the video and look up information regarding the item and/or purchase the item while still viewing the video or after viewing the video. The video viewing events and content interactions can be linked by virtue of being performed using the same user account, even though two different devices are used (and potentially two different networks, such as Wi-Fi and cellular are used).

The interaction analyzer 112 may determine distributions of content interactions with respect to viewing event times. In some embodiments, the interaction analyzer may count the number of interactions associated with a particular item and occurring at particular times with respect to the time that viewing of the movie was initiated. For example, the interaction analyzer may count the number of purchases, content browsing actions, etc. that are both (1) associated with an item and (2) initiated by viewers of the movie in each x minute interval after the corresponding viewers have initiated viewing (e.g., every 1 minute interval, 5 minute interval, 15 minute interval, etc.). The counts can then be plotted to determine a distribution of content interactions. Illustratively, a different plot may be generated for each distinct item or group of items for which interaction data has been analyzed. In some embodiments, functions can be determined from the interaction data to estimate the plotted distributions without performing any counting procedure. In some embodiments, different types of interactions may be weighted differently in the analysis through the use of different weighting factors. For example, purchase interactions may be weighted more heavily than merely viewing content referencing an item. In some embodiments, data regarding only a single type of interaction may be used (e.g., only purchase events may be analyzed).

Figure 3:
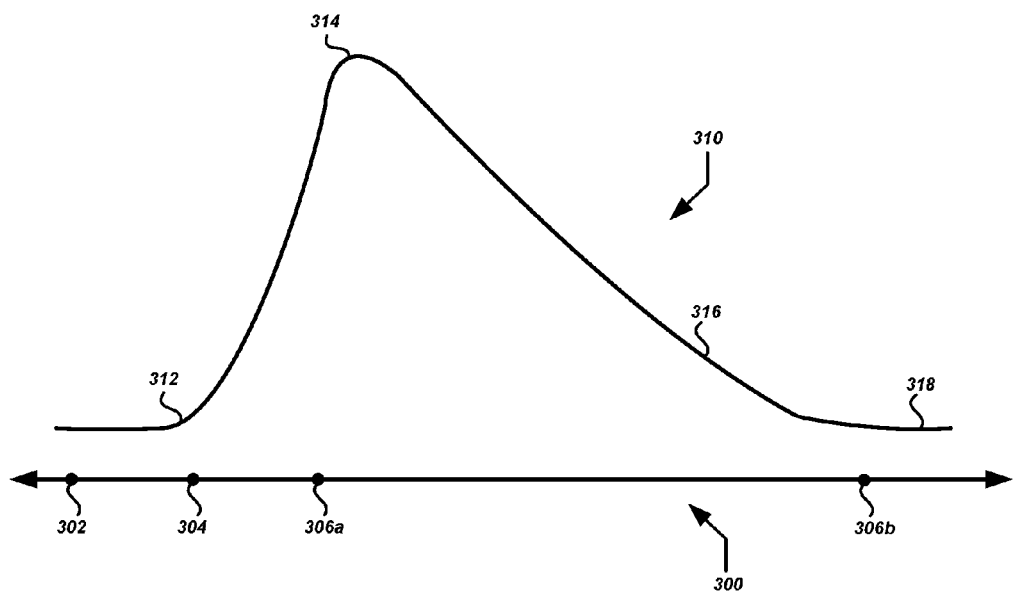
FIGS. 3 and 4 are diagrams of illustrative timelines and distributions of interactions related to video content according to some embodiments.

FIG. 3 shows an illustrative distribution of content interactions with respect to certain viewing events. The time at which viewers initiate viewing of the movie is shown as time 302 on the timeline 300. This time may be the point from which subsequent times are computed (e.g., amounts of time elapsed since time 302). One particular scene of the movie occurs at time 304, and the end of the movie occurs at time 306*a* or 306*b*. A distribution 310 of interactions with content regarding a particular item or group of items, performed by viewers who have viewed the movie, is shown such that the occurrence of individual events represented on the distribution curve correspond to points on the timeline 300. As shown, the distribution 310 is a lognormal distribution, with an increase point 312, a peak 314, a tail 316, and a flat 318. The increase point 312 may represent the point in time at which viewers begin performing more content interactions regarding a particular item per unit time than previously performed in the absence of viewing the video. The peak 314 represents the point in time at which the most interactions regarding the particular item are performed per unit of time. The tail 316 represents the gradual decrease of interactions per unit time from the peak 314. As shown, the increase point 312 coincides with or occurs shortly after the time 304 at which a particular scene in the movie occurs. As described in greater detail below with respect to other blocks of the process 200, the content management system 100 may associate the item with the scene at time 304 based on the increase in interactions, associated with the item, beginning at or shortly after time 304.

As shown in FIG. 3, the peak 314 may coincide with the end 306*a* of the movie. In some embodiments, the increase point 312, peak 314, and/or other features of the distribution 310 may occur at different times relative to times or viewing events of the movie. For example, the peak 314 and tail 316 may occur before the end 306*b* of the movie. As another example, multiple peaks may occur. Each peak may be similar in magnitude, or at least some peaks may be of different magnitudes.

Figure 4:
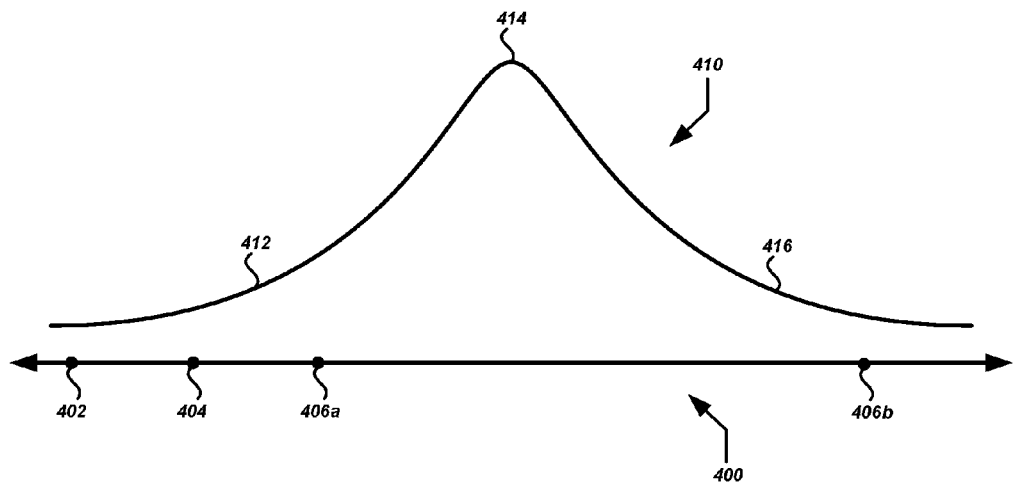

FIG. 4 shows another illustrative distribution of content interactions with respect to certain viewing events. Similar to the distribution and timeline shown in FIG. 3 and described above, the time at which viewers initiate viewing of the movie occurs at time 402, a particular scene of the movie occurs at time 404, and the end of the movie occurs at time 406*a* or 406*b*. A distribution 410 of content interactions, performed by viewers who have viewed the movie, is shown such that the occurrence of individual events represented on the distribution curve correspond to points on the timeline 400. The distribution 410 in FIG. 4 is a normal distribution, rather than the lognormal distribution 310 shown in FIG. 3. The distribution 410 in FIG. 4 includes a peak 414 between tails 412 and 416. Tail 412 represents the increase in performance of content interactions, associated with a particular item per unit time, than previously performed prior to viewing the video. The peak 414 represents the point in time at which the most interactions regarding the particular item are performed per unit of time. Tail 416 represents the gradual decrease of interactions per unit time from the peak 414. As shown, the increasing tail 412 of the normal distribution is generally associated with the time 404 at which a particular scene in the movie occurs, but the increase is not as dramatic as the increase in FIG. 3. As described in greater detail below with respect to other blocks of the process 200, the content management system 100 may associate the item with the movie generally (rather than a specific scene or timeframe within the movie) based on the increase in interactions associated with the item beginning after the start of the movie at 402.

As shown in FIG. 4, the peak 414 may occur after the end 406*a* of the movie. In some embodiments, the tails 412 and 416 and peak 414 may occur at different times relative to times or viewing events of the movie. For example, the peak 414 and tail 416 may occur before the end 406*b* of the movie. As another example, multiple peaks may occur. Each peak may be similar in magnitude, or at least some peaks may be of different magnitudes.

The distributions and related processes shown in FIGS. 3 and 4 and described above are illustrative only, and are not intended to be limiting. In some embodiments, the interaction analyzer 112 can identify or estimate other types of distributions, combinations of distributions, etc. In some embodiments, the interaction analyzer 1112 may not directly estimate such distributions. Instead, data regarding interactions and viewing event times may be analyzed using a machine learning model (e.g., a neural network) to determine which items may be associated with which portions of the movie or with the movie generally.

Returning to FIG. 2, at decision block 210, the interaction analyzer 112 or some other module or component of the content management system 100 can determine whether the distribution of interactions with respect to movie viewing events is evidence of the item being shown in the movie. For example, if one of the distributions shown in FIG. 3 or 4 is determined at block 208, then the interaction analyzer 112 may determine that a particular item is present in the movie, and the process 200 may proceed to block 212. Otherwise, if no distribution indicative of the presence of an item in the movie is found, then the process 200 may terminate at block 224, return to block 204 to process other movies, etc.

At block 212, the interaction analyzer 112 or some other module or component of the content management system 100 can determine the type of correlation between item-specific interactions and the movie. For example, the interaction analyzer 112 can determine whether the distribution of item-specific content interactions has a sharp increase, such as the lognormal distribution 310 shown in FIG. 3, or a longer leading tail, such as the standard normal distribution 410 shown in FIG. 4.

At decision block 214, the interaction analyzer 112 or some other module or component of the content management system 100 can determine whether the type of correlation between item-specific interactions and the movie is indicative of a correlation with a specific scene or point(s) in time in the movie, or with the movie generally. For example, if the distribution of item-specific content has a sharp increase, such as the lognormal distribution 310 shown in FIG. 3, then the distribution may be indicative of a correlation with a particular time that corresponds to the sharp increase. In such cases, the process 200 can proceed to block 216. If the distribution of item-specific content has a longer leading tail, such as the standard normal distribution 410 shown in FIG. 4, then the distribution may be indicative of a correlation with the movie generally. In such cases, the process 200 can proceed to block 222.

At block 216, the video analyzer 114 or some other module or component of the content management system 100 can analyze a portion of the movie to determine whether the item is present. The video analyzer 114 may include or use a computer vision component to identify the item. As described above, the interaction analyzer 112 may determine that the distribution of interactions indicates the item may be in a particular scene of the movie, such as a scene beginning or including time 304 in FIG. 3. The video analyzer 114 can then process a portion of the video including time 304, such as a window of time centered on, beginning at, ending at, or otherwise encompassing time 304. The video analyzer 114 can process the selected portion of the video specifically to determine whether the item is present in the video (e.g., if the content interactions represented by the distribution 310 relate to a wristwatch, then the video analyzer 114 can analyze the video data to identify the wristwatch).

In some embodiments, a different analysis component may be used to identify the item instead of, or in addition to, a computer vision component. For example, an audio analysis component, such as an automatic speech recognition component or an acoustic fingerprinting component, may analyze an audio portion of the video to identify a reference to the item. As another example, a textual analysis component may analyze a script or set of subtitles to identify a reference to the item.

In some embodiments, identification of an item or the verification of an item may be indirect, such as by identifying related items. For example, an item may be discussed by characters in a movie without expressly stating the name of the item and/or without an image of the item appearing in the video. Thus, it may be difficult or impossible to identify the item as being in the video or expressly mentioned in the video. However, after the occurrence of such a discussion, data may show that viewers increase the rate at which they search for content regarding the item, purchase the item, and/or perform other interactions as described above. In such cases, the appearance of related items, or the express mention of related items, may be detected to verify that the item is indeed associated with and/or generally referred to during a particular portion of the video or the video generally. Illustratively, the content management system may have access to a predetermined data set of related items, or the content management system may dynamically determine sets of related items. These data sets of related items can be used to indirectly verify a presence of an item, a reference to, or an association between the item and the video.

In some embodiments, rather than using an automated analysis component to analyze portions of video and identify items, the portions of the video may be analyzed manually by one or more human analysts. In some embodiments, no visual analysis of the video content may be performed. Instead, determinations by the interaction analyzer 112 that an item is associated with a particular time or scene in a movie may not be verified visually or automatically. For example, a statistical approximation may be used to determine a statistically significant association with a portion of the video or the video generally. Illustratively, the area under a distribution curve, such as the distributions 310 and 410 shown in FIGS. 3 and 4 may be used to determine that the item is present in or associated with the video, without verification by a video analysis component or some other process. Such statistical methods may provide the best or only way to identify certain associations, such as vague discussions or glimpses of items without clear reference to or images of the items.

At decision block 218, the content management system 100 can determine whether, at block 216 above, the item was identified in the portion of the video. If so, the process 200 can proceed to block 220. Otherwise, the process 200 can proceed to block 222.

At block 220, the content management system 100 can associate the item with the identified scene or other portion of the video. Illustratively, the content management system 100 may store information in the videos data store 120 and/or items data store 124 regarding the association of the item with the portion of video.

At block 222, the content management system has determined that the item is not correlated with a particular time or portion of the video at decision block 214, or that the item was not verified to be present in the portion of video at decision block 218. The content management system 100 can therefore associate the item with the video generally, rather than associating it with a particular portion of the video. Illustratively, the content management system 100 may store information in the videos data store 120 and/or items data store 124 regarding the association of the item with the video.

After block 220 or block 222, the process 200 may terminate at block 224, return to block 204 to process additional videos, return to block 210 to process additional portions of interaction data for the same video, etc.

Although the process 200 has been described herein with respect to video content, the description is illustrative only and is not intended to be limiting. In some embodiments, instances of—and references to—items in other types of content items may be identified. For example, the content in which items are to be identified may be image content (e.g., pictures, drawings, etc.), audio content (e.g., audio books, podcasts, music, etc.), textual content (e.g., electronic books or "e-books"), or the like. In such cases, the statistical analysis of distributions described above may be used. Alternatively or in addition, the analysis may be performed using audio-based analysis components, text-based analysis components, and the like as appropriate for the format of the content item being analyzed.

Using Item Identifications and Associations

Figure 5:
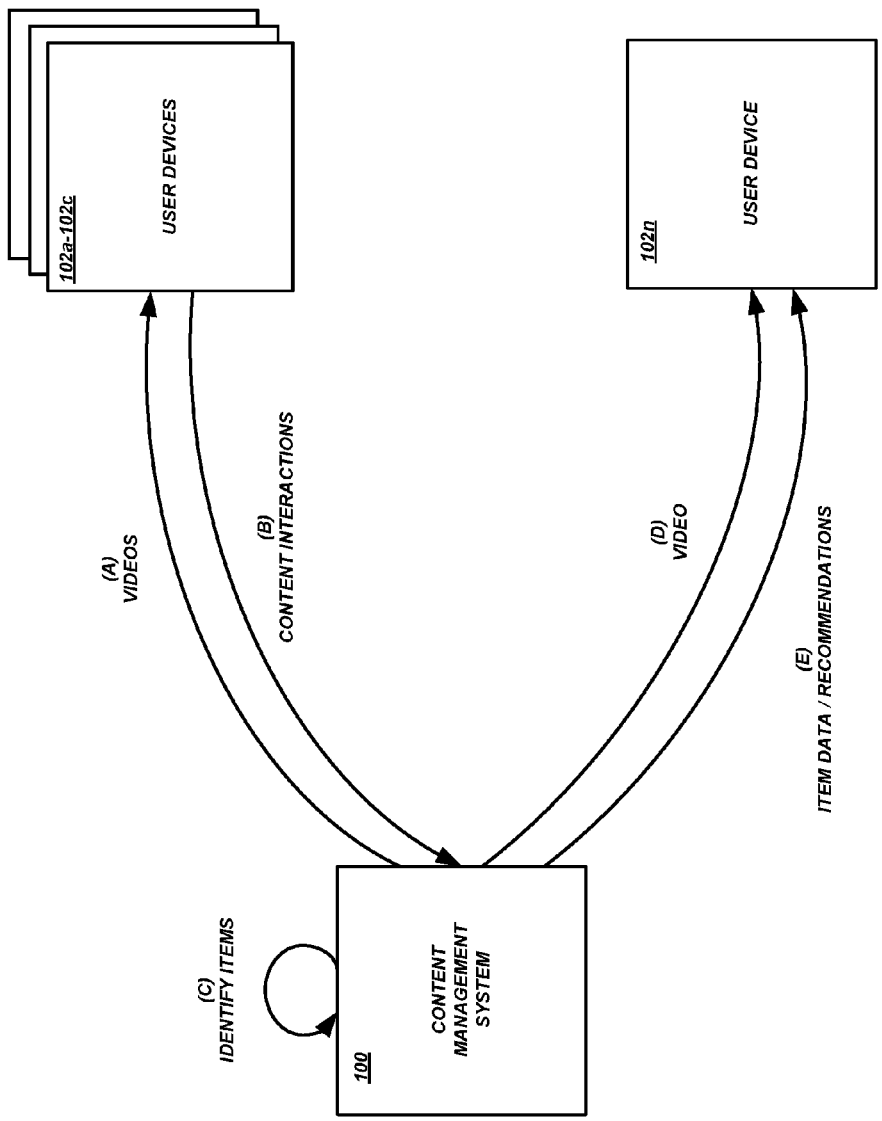
FIG. 5 is a block diagram of illustrative interactions and data flows between a content management system and various user devices according to some embodiments.

FIG. 5 is a block diagram of illustrative data flows and interactions between the content management system 100 and various user devices 102, such as data flows that may occur when viewing videos, interacting with content, etc. As shown, various user devices 102a, 102b, and 102c may access a particular video at (A). During and/or after accessing and displaying the video, viewers using the user devices 102a-102c may interact with other content at (B), and the content management system 100 can identify objects in the videos using data regarding the interactions at (C), as described in greater detail above.

A different user device 102n may access the same video from the content management system 100 at (D). Because the content management system 100 has previously identified items in the video, the content management system 100 can provide additional information regarding the items to the user device 102n at (E). In some embodiments, the content management system 100 may provide product recommendations to the user device 102 regarding products that the viewer may be interested in purchasing, such as an item identified in the video, items associated with items identified in the video, etc. In some embodiments, the content management system 100 may provide discounts for items identified in the video or items associated with items identified in the video.

The content management system 100 may provide enhancements to videos based on the items identified in the videos. For example, once a particular item has been identified as being shown in a particular scene, the content management system 100 can allow users to search for scenes in which items appear. As another example, the content management system 100 can provide supplemental information regarding the identified item or the scene, such as background information, links to content about the item, links to purchase the item, information about other scenes in which the item appears, information about other videos in which the item or related items appear, etc.

Figure 6:
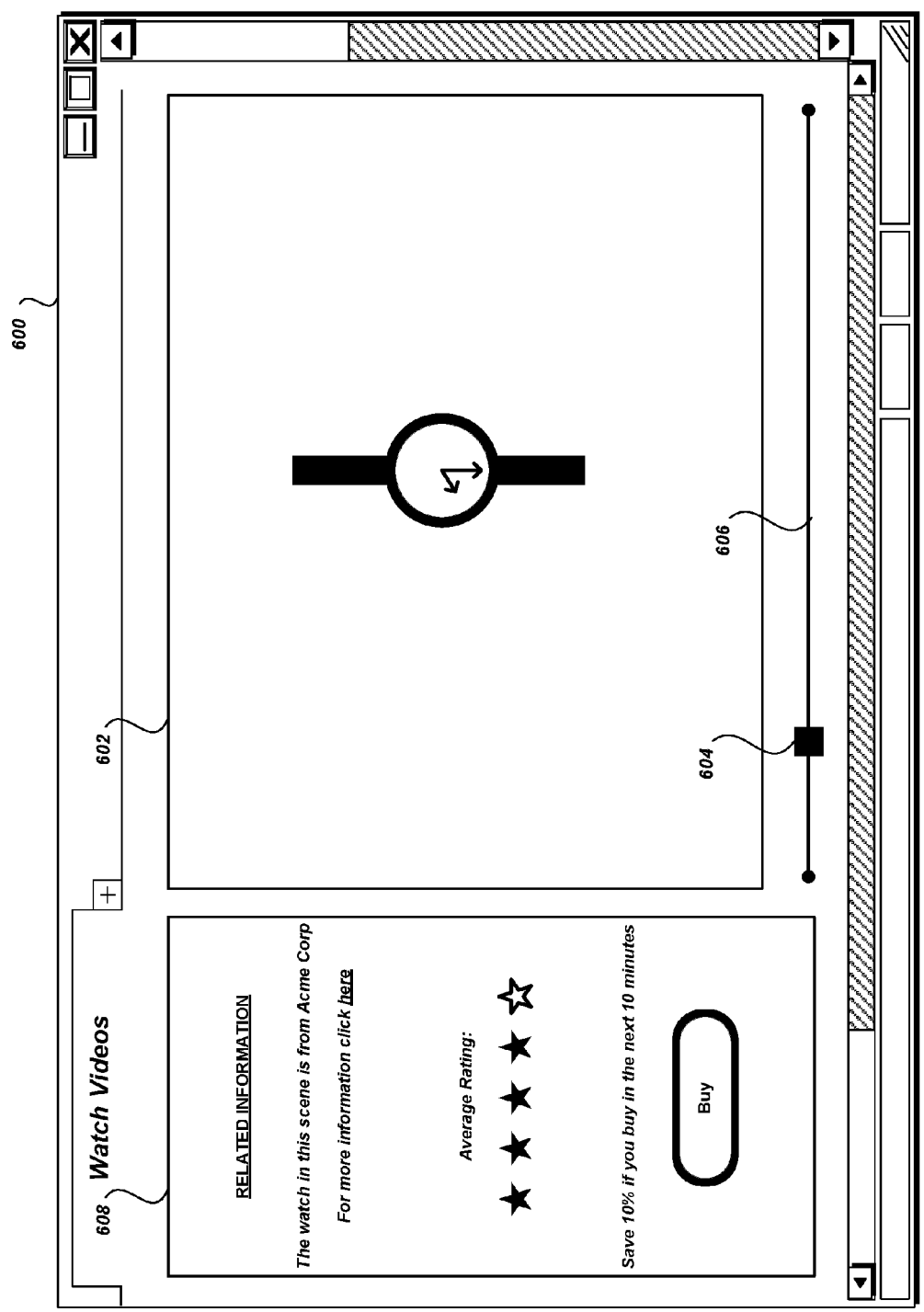
FIG. 6 is a pictorial diagram of an illustrative user interface according to some embodiments.

FIG. 6 is a pictorial diagram of an illustrative user interface 600 in which various enhancements are implemented. As shown, a video item is displayed in a video pane 602. At a particular portion of the video, represented by time 604 on the timeline 606, the interface 600 may automatically (or in response to a viewer request) display an information pane 608. The information pane 608 can include information about the identified item, links to other content associated with the item, an option to purchase the item, etc. In some embodiments, the interface 600 (or some other interface) may include information about items related to the identified item, links to other content associated with items related to the item, an option to purchase an item related to the item, etc. Illustratively, related items may be determined using data stores of related items, such as those described above with respect to verifying items through identification of related items. The related items may be presented during video playback, or independently of video playback. For example, a presentation of items that a user may be interested in based on the viewer having viewed the video may be provided to the user after the video has finished, or through a separate communication to the viewer. The list may include items that are related to items identified in the video, items in other videos that are related to the video, etc.

In some embodiments, a timeline of the video may be presented (e.g., using the interface 600 or a similar interface) during video playback, after video playback, or independently of video playback. The timeline may provide indications of which items appear in, or are otherwise related to, which scenes or windows of time in the movie. Viewers may then interact with the timeline and access the specific scenes or windows of time in which items are referenced. In this way, users can refresh their memory about individual items, search for items in videos, and the like.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    a non-transitory computer-readable memory storing executable instructions; and
    one or more computing devices in communication with the non-transitory computer-readable memory, the one or more computing devices programmed by the executable instructions to at least:
        obtain data regarding interactions of a plurality of viewers with content associated with an item, wherein the interactions comprise at least one of: browsing the content associated the item, performing a search for the content associated with the item, or initiating a purchase of the item using the content associated with the item, and wherein interactions of individual viewers of the plurality of viewers are performed within a threshold amount of time of accessing a video;
        identify an association between at least a portion of the interactions and at least a portion of the video based at least partly on an analysis of times at which the interactions are performed and times at which the video is accessed;
        analyze the portion of the video for a visual representation of the item;
        determine that the visual representation of the item is present in the portion of the video;
        provide the video to a computing device associated with an additional viewer, wherein the additional viewer is not in the plurality of viewers; and
        provide information regarding the item to the computing device associated with the additional viewer based at least partly on the visual representation of the item being present in the portion of the video, wherein the computing device associated with the additional viewer is configured to display the information regarding the item in connection with displaying the portion of the video.

2. The system of claim 1, wherein the executable instructions to identify the association between the portion of the interactions and the portion of the video comprise executable instructions to at least:
    estimate a distribution of times at which the interactions are performed with respect to times at which the video is accessed; and
    identify a statistically significant correlation between (1) a time associated with the portion of the video and (2) an increase in a rate at which interactions are performed.

3. The system of claim 1, wherein executable instructions to analyze the portion of the video for the visual representation of the item comprise executable instructions to at least analyze the portion of the video using a computer vision component configured to recognize visual representations of the item.

4. The system of claim 1, wherein the information regarding the item comprises at least one of: content associated with the item; an option to purchase the item; content associated with a second item similar to the item; or an option to purchase the second item.

5. The system of claim 1, wherein the one or more computing devices are further programmed by the executable instructions to:

estimate a distribution of times at which the interactions are performed and times at which the video is accessed; and compute an area under at least a portion of a curve representing the distribution, wherein the analysis of times at which the interactions are performed and times at which the video is accessed is based at least partly on the area under at least the portion of the curve.

6. A computer-implemented method comprising:

as performed by a content management system comprising a server computing device configured to execute specific instructions, analyzing data regarding timing of actions associated with an item relative to timing of viewing events associated with a video, wherein the actions associated with the item comprise at least one of: browsing content regarding the item, performing a search related to the item, or purchasing the item;

identifying an association between at least a portion of the actions and at least a portion of the video;

determining that the video likely comprises a visual representation of the item based at least partly on the association between the portion of the actions and the portion of the video; and providing, to a user computing device, information regarding the item based at least partly on a request to access the video.

7. The computer-implemented method of claim 6, wherein the viewing events associated with the video comprise at least one of: initiating presentation of the video, ending presentation of the video, or reaching a portion of the video.

8. The computer-implemented method of claim 6, wherein the request to access the video is received from a second user computing device separate from the user computing device.

9. The computer-implemented method of claim 6, wherein analyzing the data comprises estimating a distribution of times at which the actions are performed relative to times at which the video is viewed.

10. The computer-implemented method of claim 9, wherein identifying the association comprises identifying a statistically significant correlation between (1) a viewing event associated with the video and (2) an increase in a rate at which actions associated with the item are performed.

11. The computer-implemented method of claim 9, wherein determining that the video likely comprises the visual representation of the item comprises determining that a particular scene of the video likely comprises the representation of the item based at least partly on a type of the distribution of times at which the actions are performed relative to times at which the video is viewed.

12. The computer-implemented method of claim 9 further comprising verifying that the portion of the video comprises the visual representation of the item based at least partly on computer vision processing of the portion of the video.

13. The computer-implemented method of claim 6, further comprising:

estimating a distribution of the timing of actions associated with an item relative to timing of viewing events associated with a video; and computing an area under at least a portion of a curve representing the distribution, wherein the analyzing the data is based at least partly on the area under at least the portion of the curve.

14. A non-transitory computer storage medium storing executable code, wherein the executable code configures a computing system to perform a process comprising:

analyzing data regarding timing of actions associated with an item relative to timing of events associated with consuming a content item, wherein the actions associated with the item comprise at least one of: browsing content regarding the item, performing a search related to the item, or purchasing the item;

identifying an association between at least a portion of the actions and at least a portion of the content item;

determining that the content item likely references the item based at least partly on the association between the portion of the actions and the portion of the content item; and providing, to a user computing device, information regarding the item based at least partly on a request to access the content item.

15. The non-transitory computer storage medium of claim 14, wherein the content item comprises at least one of: an e-book, an audiobook, a music recording, an audio recording, or a video.

16. The non-transitory computer storage medium of claim 14, wherein the events associated with consuming the content item comprise at least one of: initiating presentation of the content item, resuming presentation of the content item, ending presentation of the content item, or reaching a portion of the content item.

17. The non-transitory computer storage medium of claim 14, wherein analyzing the data comprises estimating a distribution of times at which the actions are performed relative to times at which one or more portions of the content item are consumed.

18. The non-transitory computer storage medium of claim 17, wherein analyzing the data comprises computing an area under at least a portion of a curve representing the distribution of times at which the actions are performed relative to times at which one or more portions of the content item are consumed.

19. The non-transitory computer storage medium of claim 14, wherein the process further comprises verifying that the portion of the content item references the item based at least partly on one or more of: computer vision processing of a portion of video, automatic speech recognition processing of a portion of audio, acoustic fingerprinting of a portion of audio, and textual analysis of a portion of text.

20. The non-transitory computer storage medium of claim 14, wherein the information regarding the item comprises data regarding a portion of the content item with which the content item is likely to be associated, and wherein the user computing device is operable to provide access to the portion of the content item based at least partly on the data regarding a portion of the content item.

* * * * *